(12) United States Patent
Ledinh et al.

(10) Patent No.: US 8,363,974 B2
(45) Date of Patent: Jan. 29, 2013

(54) BLOCK ARTIFACT REDUCER

(75) Inventors: Phuc-Tue Ledinh, Montreal (CA); Chon-Tam Ledinh, Montreal (CA)

(73) Assignee: Qualcomm Incorporated, San Diego, CA (US)

( * ) Notice: Subject to any disclaimer, the term of this patent is extended or adjusted under 35 U.S.C. 154(b) by 386 days.

(21) Appl. No.: 12/834,731

(22) Filed: Jul. 12, 2010

(65) Prior Publication Data

US 2011/0019934 A1    Jan. 27, 2011

Related U.S. Application Data

(60) Provisional application No. 61/227,415, filed on Jul. 21, 2009.

(51) Int. Cl.
*G06K 9/40* (2006.01)

(52) U.S. Cl. ........ 382/268; 382/260; 382/266; 382/274; 382/275; 348/241; 348/252

(58) Field of Classification Search .................. 382/260, 382/266, 268, 274, 275; 348/241, 246, 252
See application file for complete search history.

(56) References Cited

U.S. PATENT DOCUMENTS

| | | | | |
|---|---|---|---|---|
| 5,572,433 | A * | 11/1996 | Falconer et al. | 700/127 |
| 6,122,065 | A * | 9/2000 | Gauthier | 356/394 |
| 6,744,046 | B2 * | 6/2004 | Valaskovic et al. | 250/288 |
| 6,919,892 | B1 * | 7/2005 | Cheiky et al. | 345/473 |
| 7,027,054 | B1 * | 4/2006 | Cheiky et al. | 345/473 |
| 2004/0120597 | A1 | 6/2004 | LeDinh et al. | |
| 2005/0207492 | A1 | 9/2005 | Pao | |
| 2006/0050783 | A1 | 3/2006 | LeDinh et al. | |
| 2006/0056724 | A1 | 3/2006 | LeDinh et al. | |
| 2007/0081596 | A1 | 4/2007 | Lin et al. | |

OTHER PUBLICATIONS

PCT International Search Report and the Written Opinion mailed Sep. 15, 2010, in related International Application No. PCT/US2010/042650.
Cherri et al., "Optical symbolic substitution—Edge detection using Prewitt, Sobel, and Roberts operators", Applied Optics, vol. 28, pp. 4644-4648, Nov. 1, 1989.
B. Ramamurthi et al., "Nonlinear space-variant for block coded images", vol. ASSP-34, pp. 1258-1268, Oct. 1986.
Ardeshir Goshtasby et al., "An adaptive window mechanism for image smoothing", *Computer Vision and Image Understanding*, vol. 111, pp. 155-169, 2008.

* cited by examiner

*Primary Examiner* — Yosef Kassa
(74) *Attorney, Agent, or Firm* — Haynes and Boone, LLP (57) ABSTRACT

A block artifact reduction system is provided. An apparatus for reducing block artifact in an image sequence according to some embodiments of the present invention includes a motion detection unit that detects a motion signal from a first frame of an image signal and a second frame of the image signal; a block border offset and motion-based correction determination (BOMCS) unit that determines block border locations based on the second frame and a correction strength based on the second frame and the motion signal; and an intensity filter that filters the second frame based on the block border locations and the correction strength to output a corrected image signal.

20 Claims, 8 Drawing Sheets

BLOCK ARTIFACT REDUCER

RELATED APPLICATIONS

This application claims priority to U.S. Provisional Application 61/227,415, filed on Jul. 21, 2009, which is herein incorporated by reference in its entirety.

BACKGROUND

1. Related Field

The present invention relates to digital image processing and, more specifically, for reducing block artifacts in a block-encoded image.

2. Background

Block-based discrete cosine transform (DCT) is a compression technique used for many standard video compression methods including ITU-T H261, H263, H264, ISO JPEG, MPEG-1, and MPEG-2. To perform a DCT, an image is first divided into blocks. DCT is applied to each row and column of each of the blocks to produce a transform coefficient array. In a typical transform coefficient array the (0,0) element in each block is the DC (zero-frequency) component, and entries with increasing vertical and horizontal index values represent higher vertical and horizontal spatial frequencies of the image.

One common problem with block-based DCT is that it can produce perceptible artifacts when an image is compressed at low bit rates. One such artifact is the appearance of block structures that are particularly visible in smooth-toned regions of the image. In an image sequence, an insufficient bit rate allocation in the compression encoder can also exacerbate blocking artifacts in fast moving regions or during scene changes. While there are existing techniques for block artifact reduction (BAR), most existing methods require known or easily detectable block borders and/or block sizes. However, some common image manipulations such as cropping and multi-generation re-encoding can make block border locations difficult to detect. When images are not produced using proper image manipulation techniques, which is common in media such as online video streaming, the block border information is often distorted or lost. As such, many known methods for BAR cannot be used.

Therefore, there is a need to provide efficient block artifact reduction methods more suitable for image sequences with unknown block sizes and also able to reduces blocking artifacts in fast moving regions.

SUMMARY

A block artifact reduction system is provided. An apparatus for reducing block artifact in an image sequence according to some embodiments of the present invention includes a motion detection unit that detects a motion signal from a first frame of an image signal and a second frame of the image signal; a block border offset and motion-based correction determination (BOMCS) unit that determines block border locations based on the second frame and a correction strength based on the second frame and the motion signal; and an intensity filter that filters the second frame based on the block border locations and the correction strength to output a corrected image signal.

A method for reducing block artifact in an image sequence according to some embodiments of the present invention includes determining a motion signal from a first frame of an image signal and a second frame of a image signal; determining block border locations from the second frame; determining a correction strength from the second frame and the motion signal; and filtering the second frame according to the block border locations and the correction strength to output a corrected image signal.

These and other embodiments of the invention are further discussed below with reference to the following figures.

DETAILED DESCRIPTION

The blocking effect is a visual artifact commonly resulting from a block-based codec working at a relatively low bit rate. The square or rectangular structures visible on the decoded image distorts the original image. The block structures are particularly pronounced in relatively flat-toned regions and in fast moving regions.

Some embodiments of a block artifact reducing (BAR) filter consistent with the present invention provide a way of correlating blocking artifacts to motion information without explicit knowledge of the block border locations of the image. Therefore, a BAR filter according to some embodiments of the present inventions is able to transform a normally spatial-only BAR into a temporally and spatially adaptive algorithm for both blocking artifact detection and correction. To reduce blocking artifacts, some embodiments of a BAR filter according to the present invention also adjust the filtering strength per pixel depending on image segmentation, the strength of block borders, and the quantity of global and local motion.

Figure 1A:
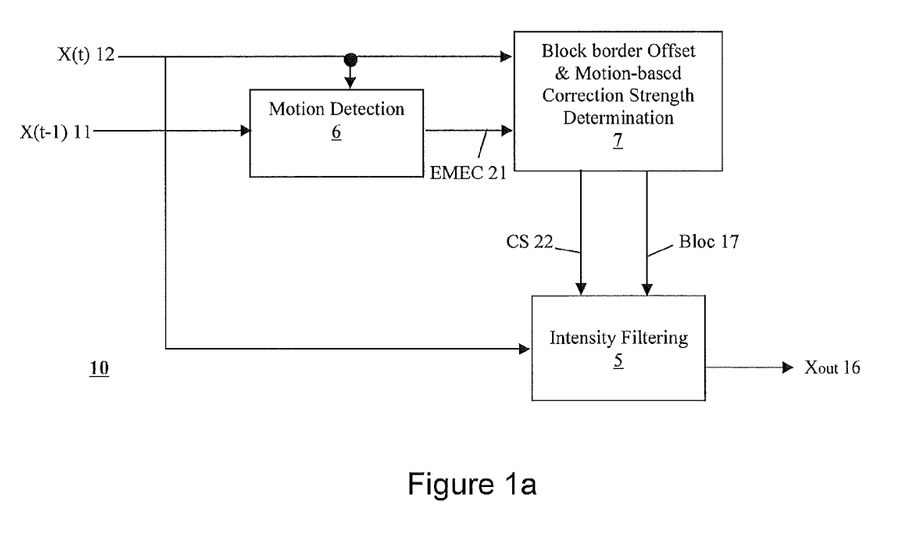
FIG. 1a shows a block diagram of an embodiment of a block artifact reducer consistent with the present invention.

FIG. 1a shows an embodiment of a BAR filter 10 for reducing blocking effect consistent with the present invention. BAR filter 10 includes a motion detection unit 6, a block border offset and motion-based correction strength determination (BOMCS) unit 7, and an intensity filtering unit 5. BAR filter 10 receives an image signal X(t) 12 and a frame delayed version of that signal X(t−1) 11. Motion detection unit 16 compares the signals X(t) 10 and X(t−1) 11 to output a motion estimation signal EMEC 21. EMEC 21 represents a motion estimate between image signals X(t) 10 and X(t−1) 11. BOMCS unit 17 detects the block border locations Bloc 17 of the image signal X(t) using line detection. The result of the line detection is accumulated to determine the prevalence of block borders in image signal X(t) 10. The prevalence of block borders is compared to a set of predetermined values to determine the level of compression of image signal X(t). A correction strength CS 22 signal is then determined by scaling the level of compression according to the motion estimation signal EMEC 21. The intensity filtering unit 15 receives the block border location Bloc 17 and the correction strength CS 22 from BOMCS 7. Intensity filtering unit 15 filters pixels in image signal X(t) 10 identified by Bloc 17 as being on a block border according to CS 22 to produced a block artifact corrected image signal Xout 16. As such, Xout 16 is corrected based on both temporal and spatial information, which may more effectively reduce blocking artifacts when compared to conventional spatial-only BAR methods.

Figure 1B:
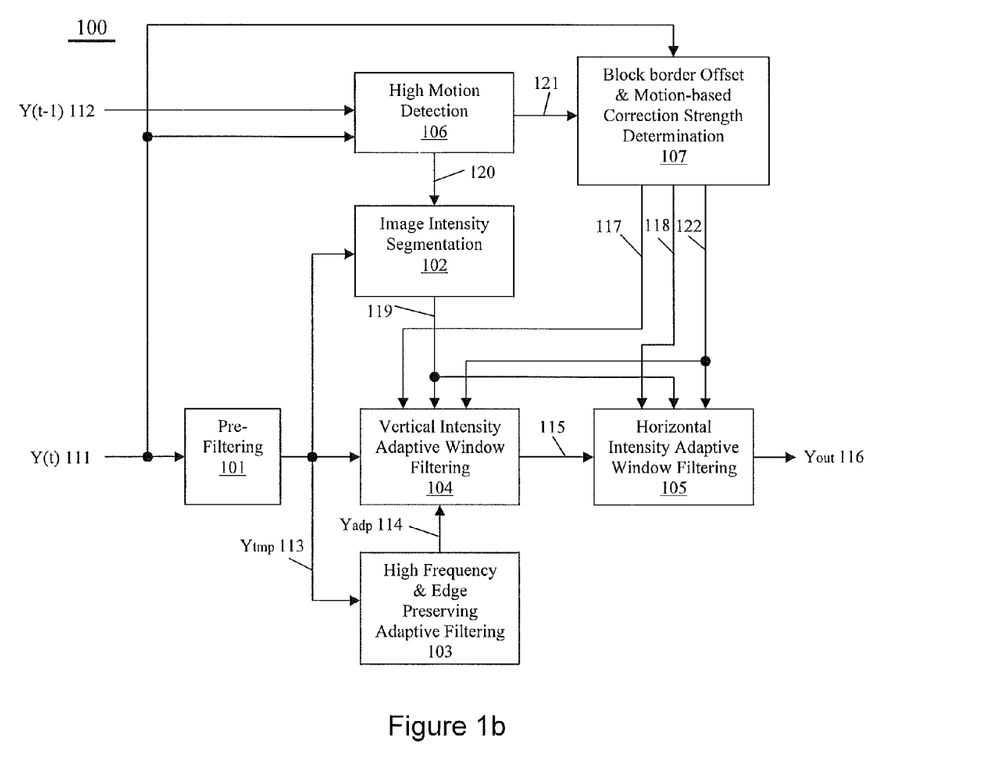
FIG. 1b shows a block diagram of another embodiment of a block artifact reducer consistent with the present invention.

FIG. 1b shows another embodiment of a BAR filter 100 for reducing blocking artifacts consistent with the present invention. Bar filter 100 includes a pre-filtering unit 101, an image intensity segmentation (IIS) unit 102, a high frequency and edge preserving adaptive filter (HEPAF) 103, a vertical intensity adaptive window filter (VIAWF) 104, a horizontal intensity adaptive window filter (HIAWF) 105, a high motion detection unit 106, and a block border offset and motion-based correction strength determination (BOMCS) unit 107.

BAR filter 100 shown in FIG. 1b has two inputs, an image data Y(t) 112 and a frame delayed image data Y(t−1) 111. The frame delayed image data Y(t−1) 111 is supplied to the high motion detection unit 106; image data Y(t) 112 is supplied to the BOMCS unit 107 and the pre-filtering unit 101. The pre-filtering unit 101 is a noise reducing filter which filters the image data Y(t) 112 to generate a pre-filtered image data Ytmp 113, used by the IIS unit 102, the VIAWF unit 104, and the HFEPAF 103. The pre-filtering unit 101 can be a number of known noise filters such as random noise or mosquito noise filters or a combination of multiple filters.

The high motion detection unit 106 compares the two image data signals Y(t) and Y(t−1) to produce a local high motion select signal 120 and an embedded motion estimation count (EMEC) signal 121. The IIS unit 102 receives the pre-filtered image signal 113 and the local high motion select signal 120 to generate an adaptive threshold value 119. The BOMCS unit 107 receives the EMEC signal 121 and the image data Y(t) to produce horizontal and vertical block border location signals 117 and 118, and a block border correction strength CS signal 122. The HFEPAF unit 103 filters the pre-filtered image signal Ytmp 113 to supply an adaptive intensity filtered signal Yadp 114 to the VIAWF 104. The VIAWF 104 filters the pre-filtered image signal Ytmp 113 according to the adaptive intensity filtered signal Yadp 114, the adaptive threshold value 119, the correction strength signal 112, and the horizontal block border location signal 117 to generate a vertical corrected value Yvert 115. The vertical corrected value Yvert 115 is further filtered by the HIAWF unit 105 according to the adaptive threshold value 119, the vertical block border location signal 118, and the correction strength signal 112. The HIAWF 105 generates an output signal 116 that is a corrected image signal and the output signal from BAR system 100.

In FIG. 1b, input data representing images Y(t) 111 and its frame delay version Y(t−1) 112 are image luminance intensity signals. Chrominance inputs of an image data are processed similarly to the luminance inputs, except that the chrominance inputs use different sampling patterns. As such, a detailed description of a BAR system for chrominance signals is omitted as it is substantially the same as BAR system 100.

An embodiment of each of the elements 102-107 that may be utilized in FIG. 1b is described in further detail with reference to FIGS. 2-7.

While the embodiment of BAR system 100 in FIG. 1b includes pre-filtering unit 101 for random noise and mosquito noise reduction, the pre-filtering unit 101 may be omitted in another embodiment, and the image signal Y(t) can be directly supplied to the IIS unit 102, the VIAWF unit 104, and HFEPAF unit 103. The BAR system 100 may also be a part of post-decoder processor for processing various artifacts.

Figure 2:
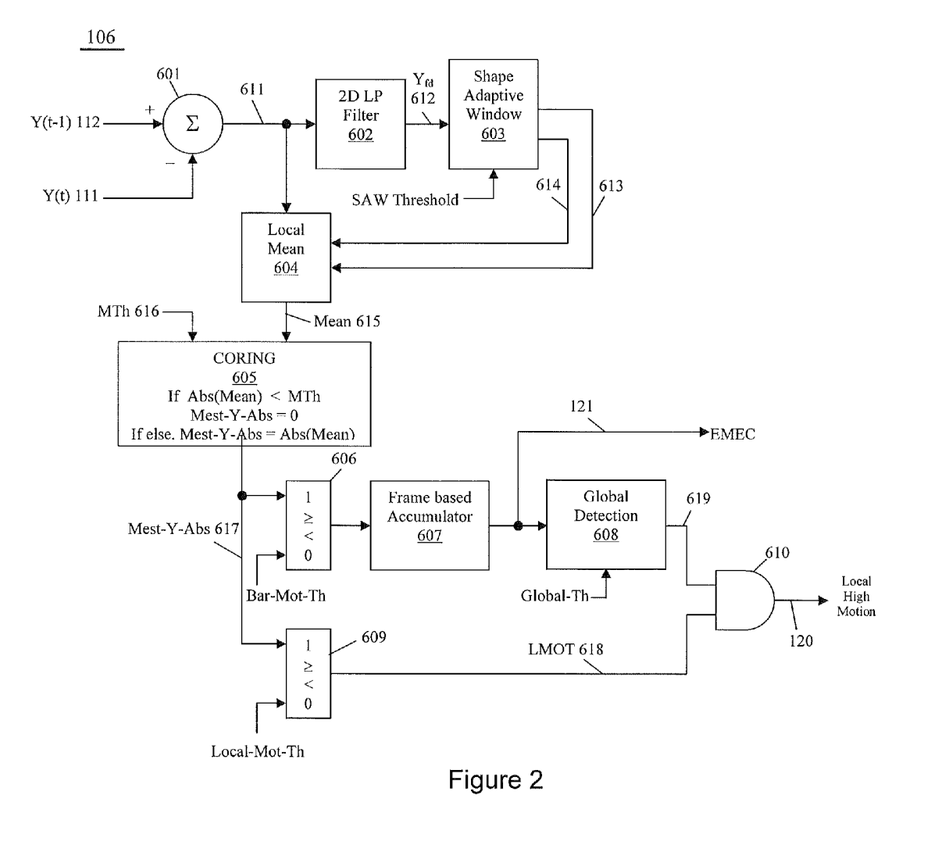
FIG. 2 shows a block diagram of an embodiment of a high motion detection consistent with the present invention.

FIG. 2 shows an embodiment of a high motion detection (HDM) unit 106 consistent with some embodiment of the present invention. The HMD unit 106 exploits the blocking effect that becomes more apparent in high contrast and fast moving regions. While a true motion vector estimation may perform a similar function, it is unnecessarily costly in most instances, even with MPEG bit stream access. The HDM unit 106 utilizes an image difference and a shape adaptive window mean technique for motion strength estimation. The image signal Y(t) 111 and its frame delay version Y(t−1) 112 are applied to the HMD 106. As image signals are generally high in noise, an image difference $Y_d$ 611 generated from Y(t) and Y(t−1) is filtered by a 2D LP filter 602 to produce a filtered difference signal $Y_{fd}$ 612.

Filter 602 can be any low pass filter that provides an appropriate attenuation. In some embodiments, one of the following impulse responses can be utilized in the LP filter 602:

$$\begin{bmatrix} 7 & 7 & 7 \\ 7 & 8 & 7 \\ 7 & 7 & 7 \end{bmatrix} \bigg/ 256. \qquad (1)$$

or $$\begin{bmatrix} 3 & 4 & 3 \\ 4 & 4 & 4 \\ 3 & 4 & 3 \end{bmatrix} \bigg/ 32 \qquad (2)$$

The filtered signal $Y_{fd}$ 612 is provided to a shape adaptive window (SAW) 603. The SAW 603 operates to classify the pixels in the window into 2 sets: pixels that have a value within a given threshold (SAW Threshold) below or above a central reference pixel and pixels that are not within that range. A first output 613 of the shape adaptive window is the pixel similarity $\omega_s$. The second output 614 is the inverse value of the number of similar pixels Ns in the window. For example, if Y is the input signal to the window 603, these definitions can be expressed as follows:

$$\omega_S = \begin{cases} 1 & \text{if } |Y_{i,j} - Y_{0,0}| < SAW \text{ Threshold} \\ 0 & \text{if } |Y_{i,j} - Y_{0,0}| \geq SAW \text{ Threshold} \end{cases} \qquad (3)$$

$$1/Ns = 1 \bigg/ \left( \sum_i \sum_j \omega_S \right)$$

The output signals 613 and 614 of the SAW 603 are used by a local mean calculation unit 604 for calculating a local mean for the high-noise image difference Yd 611. Because output signal 615 may still be high in noise, even in still regions, a coring system 605 with a threshold value $M_{Th}$ 616 may be used. Coring system 605 outputs Mest-Y-abs 617 in an absolute value, which can be an estimated motion strength in term of motion vector length and signal intensity. The technique utilized by the coring system can be similar to an embedded motion estimation. The local motion estimation signal Mest-Y-abs 617 is provided to a local motion detection unit 609 using a threshold value of Local-Mot-Th to produce a local motion detection (LMOT) signal 618. Mest-Y-abs 617 also passes through a frame-based motion detection unit 606 having a threshold of Bar-Mot-Th. An accumulator 607 counts detected motion events and outputs an embedded motion estimation count (EMEC) signal 121 that is provided to both the global detection unit 608 and a microprocessor 731, which is described in more detail with reference to FIG. 3. The global motion detection unit 608, having a predetermined threshold Global-Th, receives the EMEC signal 121 and outputs a global motion detection (GMOT) signal 619. For low latency operations, the result of the global detection unit 619 may be used for the next input image frame. An AND gate 610 combines LMOT 618 and GMOT 619 to generate a high motion select signal 120. The high motion select signal 120 is provided to intensity adaptive window filtering units 104 and 103 as shown in FIG. 1b.

In some embodiments, the frame-based motion detection unit 606 uses a threshold value Bar-Mot-Th of 32. In some embodiments, the local motion detection unit 609 uses a threshold value Local-Mot-Th of 8. In some embodiments, the local motion detection unit 608 uses a threshold value Global-Th of 32. Other threshold values may also be used for these units. Generally, larger threshold values lead to more correction of the input image.

Figure 3:
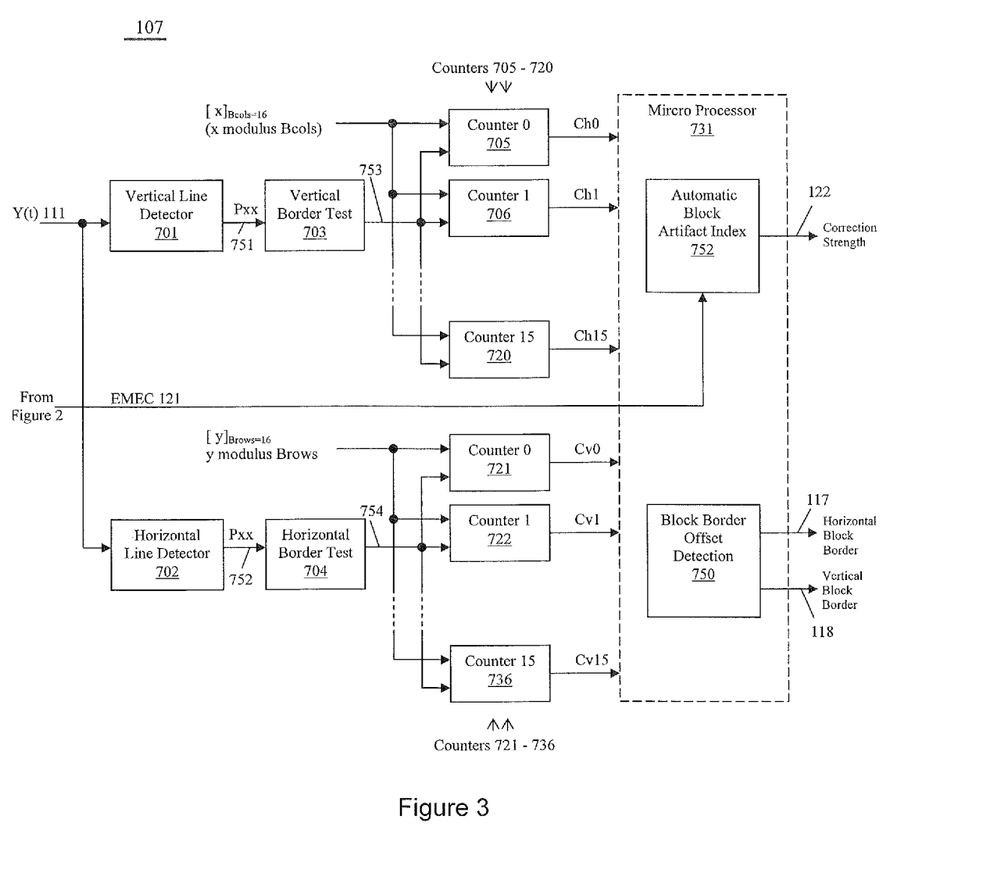
FIG. 3 shows a block diagram of an embodiment of an embedded motion estimation and high motion detection unit consistent with the present invention.

FIG. 3 illustrates the block border offset and motion-based correction strength (BOMCS) unit 107 as shown in FIG. 1b. The high-noise image Y(t) 111 and the frame-based embedded motion estimation count EMEC 121 from HDM 106 are two inputs of the BOMCS 107. BOMCS 107 generates block border location signals 117 and 118 and a frame-based correction strength signal 122. The filtered and noise-reduced Ytmp 113 shown in FIG. 1b may be utilized as input in place of Y(t) in some embodiments.

The incoming image signal Y(t) is provided to a vertical line detector 701 and a horizontal line detector 702. The vertical and horizontal line detectors 701 and 702 may utilize any edge detection filters. For example, the following impulse responses may be utilized, respectively:

$$\begin{bmatrix} -1 & 2 & -1 \\ -2 & 4 & -2 \\ -1 & 2 & -1 \end{bmatrix} \& \begin{bmatrix} -1 & -2 & -1 \\ 2 & 4 & 2 \\ -1 & -2 & -1 \end{bmatrix} \quad (4)$$

Alternatively, the vertical and horizontal line detectors may also be described by the following pair:

$$\begin{bmatrix} -1 & 2 & -1 \\ -1 & 2 & -1 \\ -1 & 2 & -1 \end{bmatrix} \& \begin{bmatrix} -1 & -1 & -1 \\ 2 & 2 & 2 \\ -1 & -1 & -1 \end{bmatrix} \quad (5)$$

The filter output 751 is sent to vertical border test 703 to determine, in a preliminary manner, whether a pixel is on a vertical border. The vertical border test 703 operates to reduce false detection and may be based on both the amplitude and the sign of the signal 751. The resulting binary output 753 for the pixel coordinates (x, y) is sent to horizontal counters 705-720. One horizontal counter 705-720 corresponding to a [x] modulus is active at a time. Each counter stores a count of the number of pixels that is likely on a vertical border in one pixel column of the image. Similarly, the filter output 752 is sent to horizontal border test 704 to determine, preliminarily, whether a pixel is on a horizontal border. The resulting binary output 754 for the pixel coordinates (x, y) is sent to vertical counters 721-736. Only one vertical counter corresponding to a [y] modulus is active at a time. Each counter stores a count of the number of pixels that is likely on a horizontal border in one pixel row of the image.

The counter outputs, Ch0-15 and Cv0-15, are sent to an integrated microprocessor 731 for further analysis. The analysis includes two parts: block border offset detection (BOD) 750 and automatic block artifact index (ABAI) 750.

The automatic block artifact index ABAI 752 calculation is mainly based on two types of indicators: 1) the frame-based embedded motion estimation counter EMEC 121 and 2) the group of frame-based counters Ch0-Ch15 and Cv0-Cv15. Determining the most prevailing of the frame-based counters Ch0-Ch15 and Cv0-Cv15 may indicate the most probably block artifact offset. To do this, ABAI first correlates the values of the accumulated counters to empirically pre-determine values that represent various levels of "blockiness". These pre-determined values are obtained by measuring subjective blocking artifact stemming from multiple levels of compression throughout a standard set of content. By matching sets of block offset counters to a set that best represents a level of compression, or inversely, a degree of blockiness, an automated frame-based block correction strength may be obtained.

However, as this automated block correction strength value may fluctuate greatly between two or more consecutive frames for several reasons (group of picture (GOP) structure, overly sensitive detection module, etc.), an automated block correction strength history may be maintained in the micro processor 731. With an automated block correction strength history, the automated block correction strength is retained across multiple frames to obtain a progressive mean value in simpler applications to minimize processing fluctuations. Also, knowing that blocking artifacts may be more explicit on a first set of frames compared to a second set of frames, their applied block correction strength can be mapped to the detected GOP structure. This may be accomplished using a second stored history that detects a periodicity (if any) of the acquired value.

The EMEC signal 121 may then be used to modulate the automated block correction strength to generate a correction strength (CS). In some embodiments, CS is kept within a certain range of the progressive mean value. By representing the quantity of motion present from frame-to-frame, the EMEC 121 is taken into account to: 1) boost the correction strength applied when high motion is detected or 2) temper the GOP periodicity detection.

BOD 750 provides border offset and generates a horizontal border location signal 117 and a vertical border location signal 118 from the values restored in frame-based counters Ch0-15 and Cv0-15. A high counter value indicates a possible location of a block border. The outputs from GOP and BOD are used to control the vertical and horizontal intensity adaptive window filtering units (VIAWF and HIAWF) 104 and 105 shown in FIG. 1b.

The BOD 750 may be implemented by software. A software implementation of ABAI 752 may be executed in parallel with the BOD 750 and uses the same counters in conjunction with the embedded motion estimation counter 121 to decide the strength of filtering needed on a per-frame basis.

Figure 4:
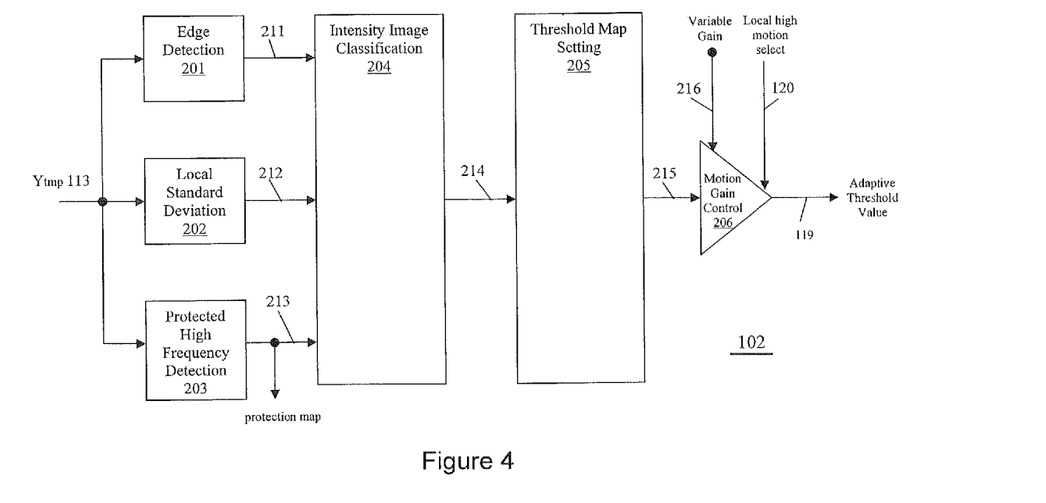
FIG. 4 shows a block diagram of block border offset and motion-based correction strength detection unit consistent with the present invention.

FIG. 4 shows a block diagram of the image intensity segmentation (IIS) unit 102 shown in FIG. 1b. The IIS unit 102 provides an image classification card 204 and a threshold map 205 to determine an adaptive threshold value 119 for the two intensity adaptive window filtering units 104 and 105 shown in FIG. 1*b*. The IIS unit 102 has an input signal Ytmp 113 that is provided to an edge detection (ED) unit 201, a local standard deviation estimator (LSDE) 202, and a protected high frequency detector (PHFD) 203.

The ED unit 201 can be a high performance edge detector. Alternatively, the ED unit 201 can be based simply on the Sobel or Prewitt operators, or Sobel or Prewitt compasses. Sobel and Prewitt operators are described in detail in Cherri, Abdallah K. and Karim, Mohammad "Optical symbolic substitution—Edge detection using Prewitt, Sobel, and Roberts operators" *Applied Optics* (ISSN 0003-6935), vol. 28, Nov. 1, 1989, p. 4644-4648 herein incorporated by reference in its entirety. In some embodiments of the ED unit 201, 3×3 Sobel compasses for 4 directions may be utilized. The input signal Ytmp 113 is convoluted with a Sobel or Prewitt operator to calculate the gradient of the image intensity of the input signal Ytmp 113 at each pixel. The result shows how "abruptly" or "smoothly" the image changes at that pixel, and therefore how likely it is that that part of the image represents an edge.

Sobel and Prewitt operators both use two 3×3 kernels which are convolved with an original image to calculate approximations of the derivatives—one for horizontal changes, and one for vertical. If we define A as the source image, and Gx and Gy are two images which at each point contain the horizontal and vertical derivative approximations, the Sobel operator is computed by:

$$G_y = \begin{bmatrix} +1 & +2 & +1 \\ 0 & 0 & 0 \\ -1 & -2 & -1 \end{bmatrix} * A \text{ and } G_x = \begin{bmatrix} +1 & 0 & -1 \\ +2 & 0 & -2 \\ +1 & 0 & -1 \end{bmatrix} * A \quad (6)$$

The Prewitt operator is computed by:

$$G_x = \begin{bmatrix} -1 & 0 & +1 \\ -1 & 0 & +1 \\ -1 & 0 & +1 \end{bmatrix} * A \text{ and } G_y = \begin{bmatrix} -1 & -1 & -1 \\ 0 & 0 & 0 \\ +1 & +1 & +1 \end{bmatrix} * A \quad (7)$$

After a sum of the absolute values of Sobel or Prewitt convolution outputs, calculated by $G=\sqrt{G_x^2+G_y^2}$, a threshold comparator and some binary context-based filters can be applied to remove isolated and/or add missing decision. The ED unit 201 then provides the result of edge detection as a binary signal 211 to an intensity image classification (IIC) unit 204.

The LSDE unit 202 estimates a local standard deviation of the input signal Ytmp 113. A sliding window may be utilized to improve the precision of the estimation. The sliding window in the LSDE 202 can utilize a local segmentation that classifies the pixels into two groups: pixels with values that are within a threshold value from a central reference pixel and pixels outside of that range. The mean and the standard deviation are calculated only with the pixels that are classified as within the threshold range. The LSDE output 212 is applied to the IIC unit 204.

The PHFD unit 203 generates a protection map signal 213, which identifies pixels in high frequency image regions to be protected from correction. The PHFD 203 receives the input signal Ytmp 113 and can be based on a Laplacian 3×3 filter, a threshold comparator, and add and remove binary filters. For example, an impulse response of a possible Laplacian filter used in the PHFD 203 may be given by:

$$\begin{bmatrix} -1 & -2 & -1 \\ -2 & 12 & -2 \\ -1 & -2 & -1 \end{bmatrix} \bigg/ 8 \quad (8)$$

In an embodiment using 8-bit image data, the threshold value may be set to 48. For a 10 bits image input, threshold value may be multiplied by 4 to achieve a similar result. Other high frequency detection methods may also be used. The PHFD 203 outputs a protection map 213 which indicates pixel high frequency areas of the image input Ytmp.

Intensity image classification (IIC) unit 204 uses the input from ED 201, LSDE 202, and the PHFD 203 to segment pixels of the image signal Ytmp into classes. In a five-class embodiment, the classes or regions can be: no correction, texture, edge, low texture, and flat regions. Pixels identified by the protection map 213 are placed in the no correction class. Pixels the ED unit 201 identifies as on the edge are placed into the edge class. The remaining pixels are separated into texture, low texture, and flat region classes depending on their relative value compared to the local mean and the value of the local standard deviation as calculated by the LSDE 202. An output signal 214 of the IIC 204 is then sent to threshold map setting unit 205.

Threshold map setting unit 205 converts the IIC 204 output 214 into a set of basic threshold values 215. In an eight-bit image input embodiment the basic threshold values can be as follows:

No Correction-Threshold=0

Texture-Threshold=2

Edge-Threshold=3

Low Texture-Threshold=6

Flat-Threshold=12 (9)

Different values may be used in alternative embodiments.

The threshold signal 215 is further adjusted in a motion gain control unit 206, which combines the basic threshold values with motion information. Motion gains can be, for example, 1, 1.5, 2, or 4 depending on a variable gain value 216. The variable gain can, for example, be obtained by a user interface, be selected by a pre-processing analysis block that determines the general quality of the input image which in turn affects the gain, or may be preset in software or otherwise. The local high motion select signal 120 supplied by the high motion detection unit 106 shown in FIGS. 1*b* and 2 controls whether a variable gain is applied. The local high motion select signal 120 determines if the threshold values 215 is multiplied by motion gain 216 or the image segmented basic values 215 is outputted as the adaptive threshold value 119. The adaptive threshold value signal output 119 of image intensity segmentation (IIS) 102 is sent to both vertical and horizontal intensity adaptive window filtering (VIAWF, HIAWF) units 104 and 105 as illustrated in FIG. 1*b*.

Figure 5A:
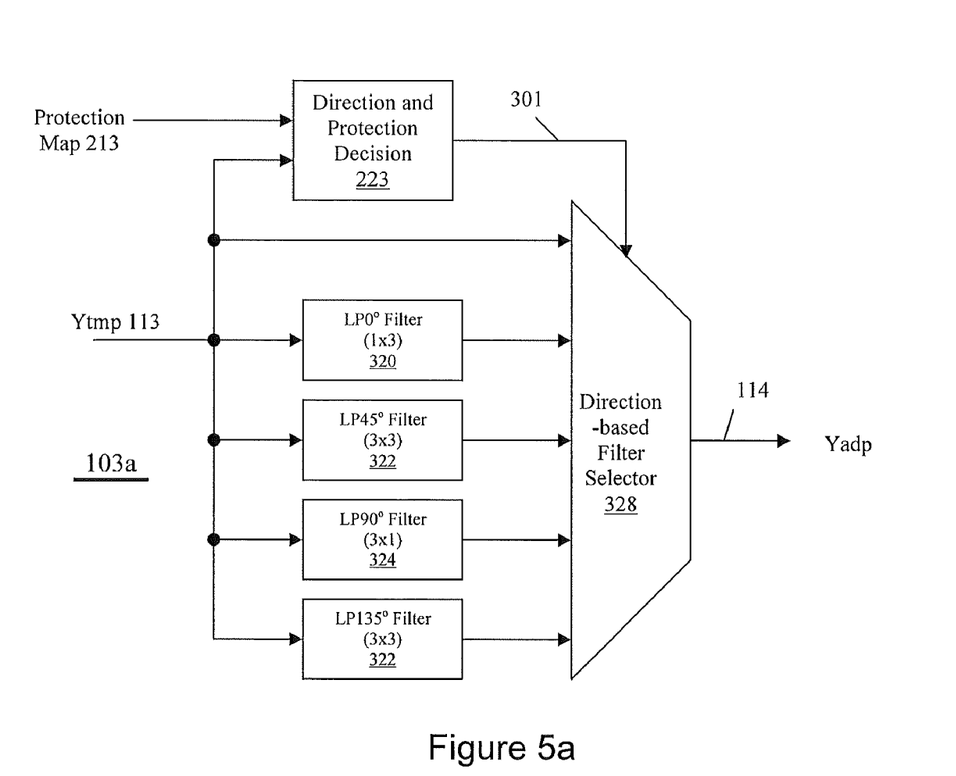
FIG. 5a shows a block diagram of a high frequency and edge preserving adaptive filter that can be utilized with some embodiments of the present invention.

FIG. 5*a* shows a block diagram of an edge preserving adaptive filter 103*a*. Generally, an edge preserving adaptive filter 103*a* may be utilized as a detail preserving high performance noise reducer (NR). The edge preserving adaptive filter, illustrated in FIG. 5*a*, receives the Ytmp 113 as input signal and is based on four directional low-pass (LP) filters LP0° 320, LP45° 322, LP90° 324, and LP135° 326, connected in parallel. The filter impulse response of these filters is composed of three taps (1, 2, 1)/4. A detail preserving adaptive filter is described in B. Ramamurthi and A. Gersho, "Nonlinear Space-variant for block coded images", vol ASSP-34, October 1986, pp 1258-1268 and is incorporated herein by reference in its entirely. The output signal from LP filters 320, 322, 324, and 326 and an unfiltered input signal Ytmp 113 are applied to the directional-based filter selector 328, which is driven by a direction map 301 outputted by a direction and protection decision unit 223. As a noise reducer, the configuration shown in FIG. 5a has some drawbacks. First, filtering is carried out on all other regions except for explicitly protected zones. Additionally, filtering only the block borders may not be sufficient in counteracting blocking artifact. There is therefore a need for a system that more sufficiently reduces blocking artifact.

Figure 5B:
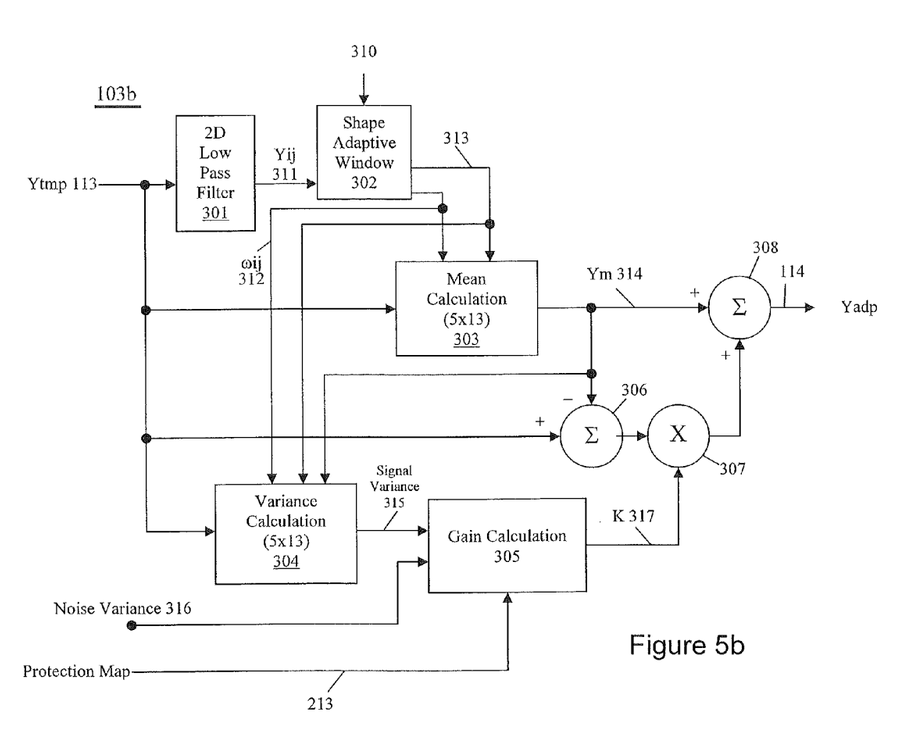
FIG. 5b shows a block diagram of an embodiment of a high frequency and edge preserving adaptive filter consistent the present invention.

FIG. 5b, shows a block diagram of an embodiment of the high frequency and edge preserving adaptive filter (HEPAF) 103b consistent with the present invention, some embodiment that address the drawbacks of the embodiment shown in FIG. 3a. The HEPAF unit 103b shown in FIG. 5b is a noise reduction unit based on shape adaptive window filter that minimizes mean squared error and is suitable for mosquito noise reduction. In HEPAF 103b, the input signal Ytmp 113 is applied to a 2D low-pass filter 301, a mean calculation unit 303, a subtractor 306, and a variance calculation unit 304. An example of 3×3 low-pass filter 301 can be realized by the following impulse response:

$$\begin{bmatrix} 1 & 2 & 1 \\ 2 & 4 & 2 \\ 1 & 2 & 1 \end{bmatrix} \Big/ 4. \tag{10}$$

Other noise reduction filters may also be used. The low-pass signal output Y 311 is provided to a sliding shape adaptive window (SAW) 302. The SAW 302 operates to classify the pixels in the window into 2 sets, similar to the SAW 603 previously described with reference to FIG. 2. The SAW 302 outputs a first output $\omega_{ij}$ 312 representing pixel similarity and a second output 313 which is the inverse value of the number of similar pixels N in the window. Both of the outputs from SAW 302 are provided to the variance calculation unit 304 and the mean calculation unit 303.

The mean calculation unit 303 provides a local mean intensity output Ym 314 defined on the set of similar intensity pixels:

$$Y_m = \sum_i \sum_j Y_{ij} \omega_{ij} / N. \tag{11}$$

The variance calculation unit 304 is defined on the set of similar intensity pixels to provide a signal variance value 315. Generally, signal variance can be defined as follows $$\text{Signal Variance} = \sum_i \sum_j (Y_{ij} - Y_m)^2 \omega_{ij} / N. \tag{12}$$

Other methods of mean and variance calculation may also be used.

The signal variance 315, a noise variance 316, and the protection map 213 shown in FIG. 2 are applied to a gain calculation unit 305. Noise variance 316 can be defined by user input and provides adjustment to the strength of the filtering. Since a SAWF is an edge preserving filter, the modification for high frequency protection, if needed, consists of setting the gain K 317 equal to 1 in the gain calculation unit 305. More specifically, the expression of gain can be given by:

$$K = 1, \text{ if Protection Map } 213 = 1 \tag{9}$$

$$K = \left(0, \frac{\text{Signal Variance} - \text{Noise Variance}}{\text{Signal Variance}}\right), \text{else.} \tag{10}$$

As the Noise Variance should not exceed the SignalVariance, K is constrained between 0 and 1. Therefore, NoiseVariance directly controls the 'blend' factor K in areas defined other than '1' by Protection Map 213.

As illustrated by FIG. 5b, a signal output Yadp 114 is given by:

$$Yadp = Ym + K(Ytmp - Ym). \tag{11}$$

which is carried out by function units 306, 307, and 308. As such, if a pixel is on the protection map 213, K 317 is equal to 1, and Yadp=Ytmp, meaning that the signal Ytemp 113 is unfiltered and output as signal Yadp 114. Otherwise, Ym is adjusted according to the gain value K to produce Yadp. Yadp is sent to the vertical intensity adaptive window filtering unit 104 as shown in FIG. 1b. Although HEPAF 103b is shown in FIG. 1b, in some embodiments, the HEPAF (103a or 103b) could be omitted if Y(t) is sufficiently low in noise or the pre-filtering unit 101 alone is adequate for noise reduction. In such a case, HEPAF 103 could be by-passed by adding appropriate delay for latency compensation and the delayed Y(t) 111 or Ytmp 113 can be directly used as Yadp 114.

Figure 6:
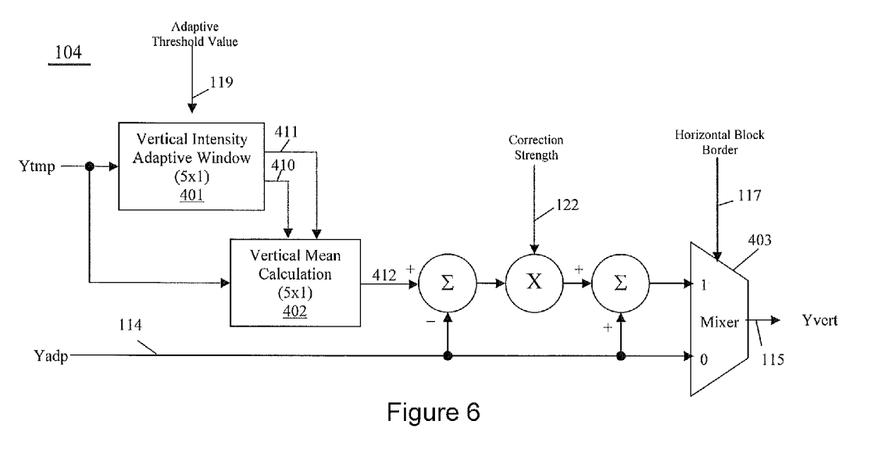
FIG. 6 shows a block diagram of an embodiment of a vertical intensity adaptive window filtering unit consistent with the present invention.

FIG. 6 shows an embodiment of a vertical intensity adaptive window filtering (VIAWF) unit 104. The image signal input Ytmp 113 is applied to a vertical intensity adaptive window (VIAW) 401 and a vertical mean calculation (VMC) unit 402. The VIAWF unit 104 is based on a SAWF with a gain K equal to 0 and a vertical 1D sliding window. The dimension of the sliding window is chosen to optimized system performance; the dimension can be, for example, 5×1. Pixels are classified into two groups by the VIAW 401 depending on whether or not they have a similar intensity to a central reference pixel intensity. Pixel-based classification threshold is the adaptive threshold value signal 119 provided from previously described image segmentation unit 102 and high motion detection unit 106. If the threshold value is sufficiently high, the number of similar pixels in a window can be greater than 1. The VIAW 401 provides two outputs 410 and 411, similarly to that presented in equation (3), which describes a similar SAW filter. Outputs 410 and 411 are used by the vertical mean calculation unit 402 to calculate the vertical local mean Yvm 412. The vertical local mean Yvm 412 and the adaptive intensity filtered Yadp 114 from the HFEPAF unit 103 is combined with the correction strength (CS) 122 and the horizontal block border location signal 117 from the BOMCS unit 107 through a mixer 403 to provide a vertical corrected value Yvert 115, such that $$Yvert = Yadp + (Yhm - Yadp) \cdot CS \text{ at horizontal border} \tag{12}$$

$$Yvert = Yadp \text{ elsewhere.} \tag{13}$$

As such, the correction is maximized (Yvert=Yvm) when CS is maximized and is equal to 1.

Figure 7:
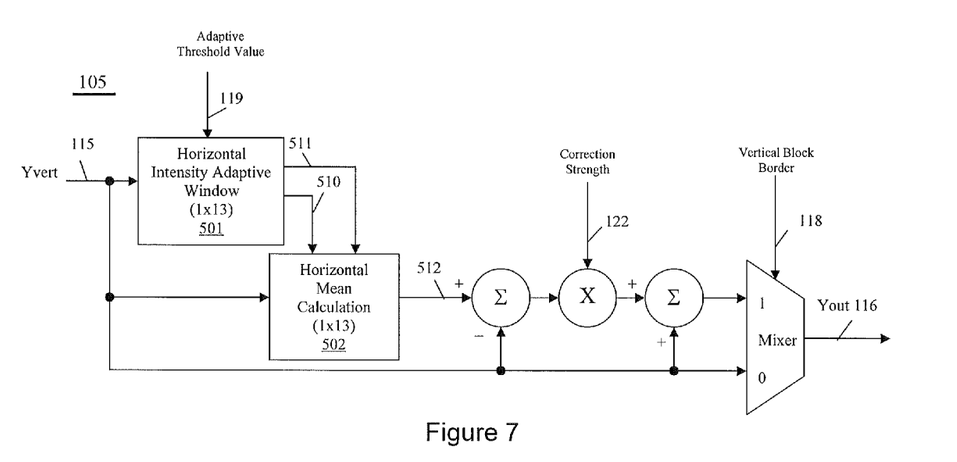
FIG. 7 shows a block diagram of an embodiment of a horizontal intensity adaptive window filtering unit consistent with the present invention.

Now referring to FIG. 7, the vertical corrected signal Yvert 115 from the VIAWF 104 is applied to a horizontal intensity adaptive window filtering HIAWF unit 105. The HIAWF 105 includes a horizontal intensity adaptive window 501 and a horizontal mean calculation unit 502. The HIAWF 501 functions similarly to the VIAWF described with reference to FIG. 6 except that the window 501 used in the horizontal intensity adaptive window 501 is a 1D horizontal window. Also, since the two vertical and horizontal filtering systems are coupled in series, only vertically corrected image signal Yvert 115 is supplied as image input. Yhm represents the horizontal mean signal output 512 of the mean calculation unit 502, and the signal output Yout 116 is given by the following expression:

$$Yout=Yvert+(Yhm-Yvert)\cdot CS \text{ at Vertical Border Mask}, \quad (17)$$

$$Yout=Yvert, \text{ elsewhere}. \quad (18)$$

With the vertical and horizontal intensity adaptive window filtering units 104 and 105, the correction is performed twice, vertically and horizontally, at the block border corner.

The horizontal intensity adaptive window filtering unit 105 outputs Yout 116, which is the block artifact corrected image signal output of the Bar system 100.

Bar systems 100 uses temporal information in scaling the correction strength 122 of block border correction. Temporal information is also utilized to adjust the gain applied to adaptive threshold values Intensity adaptive windows 401 and 502 in VIAWF 104 and HFEPAF 105 respectively. By using motion information in a normally spatial-only BAR, BAR system 100 is able to utilize temporally and spatially adaptive algorithms both in terms of detection and correction of blocking artifacts to reducing block artifact in an image sequence.

Embodiments of the invention described above are for illustrative purposes only. While elements of the embodiments are described, these elements may be implemented through hardware, software. In general, embodiments of the present inventions can be implemented on any device capable of processing images. While exemplary array dimensions and various values given in the description of the embodiments, other dimensions and values can be utilized without departing from the spirit of the disclosure. One skilled in the art may recognize various alternative embodiments from those specifically disclosed. Those alternative embodiments are also intended to be within the scope of this disclosure. As such, the invention is limited only by the following claims.

What is claimed is:

1. A apparatus for reducing block artifact in an image sequence comprising:
    a motion detection unit that detects a motion signal from a first frame of an image signal and a second frame of the image signal;
    a block border offset and motion-based correction determination (BOMCS) unit that determines block border locations based on the second frame and a correction strength based on the second frame and the motion signal; and
    an intensity filter that filters the second frame based on the block border locations and the correction strength to output a corrected image signal.

2. The apparatus of claim 1 wherein the BOMCS unit determines a level of compression of the second frame based on a prevalence of block borders detected in the second frame and determines the correction strength by modulating a correction value associated with the level of compression and the motion signal.

3. The apparatus of claim 1 wherein the BOMCS unit stores a correction strength history through multiple frames of the image signal and determines the correction strength based at least partially on the correction strength history.

4. The apparatus of claim 3 wherein the BOMCS unit stores a correction strength periodicity history and determines the correction strength based at least partially on the correction strength periodicity history.

5. The apparatus of claim 1 wherein the intensity filter includes a vertical intensity adaptive window filter and a horizontal intensity adaptive window filter which sequentially filters of the second frame.

6. The apparatus of claim 1 further comprising:
    an image intensity segmentation unit which determines an adaptive threshold signal using the first frame of the image signal;
    wherein the intensity filter includes an intensity adaptive window filter, and the adaptive threshold signal is used as an adaptive threshold value of the intensity adaptive window filter.

7. The apparatus of claim 6 wherein the motion detection unit determines a local high motion select signal and a gain is applied to the adaptive threshold signal for pixels selected by the local high motion select signal.

8. The apparatus of claim 6 wherein the image intensity segmentation unit segments the second frame into regions each corresponding to an adaptive threshold signal value.

9. The apparatus of claim 1 further comprising a pre-filtering unit that reduces the noise of an original second frame of the image signal to output the second frame.

10. The apparatus of claim 1 further comprising a detail preserving adaptive filter that filters the image signal and output an adaptive image signal to the intensity filter, wherein the intensity filter outputs the adaptive image signal for regions of the image signal not indicated by the block border locates to be on a block border.

11. A method for reducing block artifact in an image sequence comprising:
    determining a motion signal from a first frame of an image signal and a second frame of a image signal;
    determining block border locations from the second frame;
    determining a correction strength from the second frame and the motion signal; and
    filtering the second frame according to the block border locations and the correction strength to output a corrected image signal.

12. The method of claim 11 wherein determining the correction strength comprises:
    determining a level of compression of the second frame based on a prevalence of block borders detected in the second frame; and
    modulating a correction value associated with the level of compression and the motion signal to output the correction strength.

13. The method of claim 11 further comprising:
    storing a correction strength history through multiple frames of the image signal;
    wherein the determining of the correction strength is based at least partially on the correction strength history.

14. The method of claim 13 further comprising:
    storing a correction strength periodicity history;
    wherein the determining of the correction strength is based at least partially on the correction strength periodicity history.

15. The method of claim 11 wherein the filtering the second frame comprise:
    filtering the second frame using a vertical intensity adaptive window filter to output a vertically corrected second frame; and
    filtering the second frame using a horizontal intensity adaptive window filter to output the corrected image.

16. The method of claim 11 further comprising:
    segmenting the second frame into regions; and assigning an adaptive threshold signal value to each region to output an adaptive threshold signal;

wherein the intensity filter includes an intensity adaptive window filter, and the adaptive threshold signal is used as an adaptive threshold value of the intensity adaptive window filer.

17. The method of claim 16 further comprising:

determining a local high motion select signal from the first and second frame; and applying a gain to the adaptive threshold signal for pixels selected by the local high motion select signal.

18. The method of claim 16 further comprising:

filtering an original image signal to output the second frame of the image signal.

19. The method of claim 11 further comprising: using preserving adaptive filter to filter the image data and output an adaptive image signal to the intensity filter, wherein the adaptive image signal is outputted as the corrected image signal for regions of the image signal not indicated by the block border location signal to be on a block border.

20. An apparatus for reducing the blocking artifact in a block-based code image comprising:

a motion detection unit that determines a motion estimation signal and a local high motion select signal from a first frame of an image signal and a second frame of a image signal;

a block border offset and motion-based correction determination (BOMCS) unit which determines vertical and horizontal block border locations based on the second frame and a correction strength based on the second frame and the motion signal;

an image intensity segmentation unit which segments the second frame into regions and outputs an adaptive threshold signal assigning a threshold value to each of the regions; and a vertical intensity adaptive window filter and a horizontal intensity adaptive window filter sequentially filters the pixels indicated by the block border locations according the adaptive threshold signal and the correction strength.

* * * * *